(No Model.) 4 Sheets—Sheet 3.
B. F. TEAL.
FLUID PRESSURE BRAKE APPARATUS.
No. 538,851. Patented May 7, 1895.
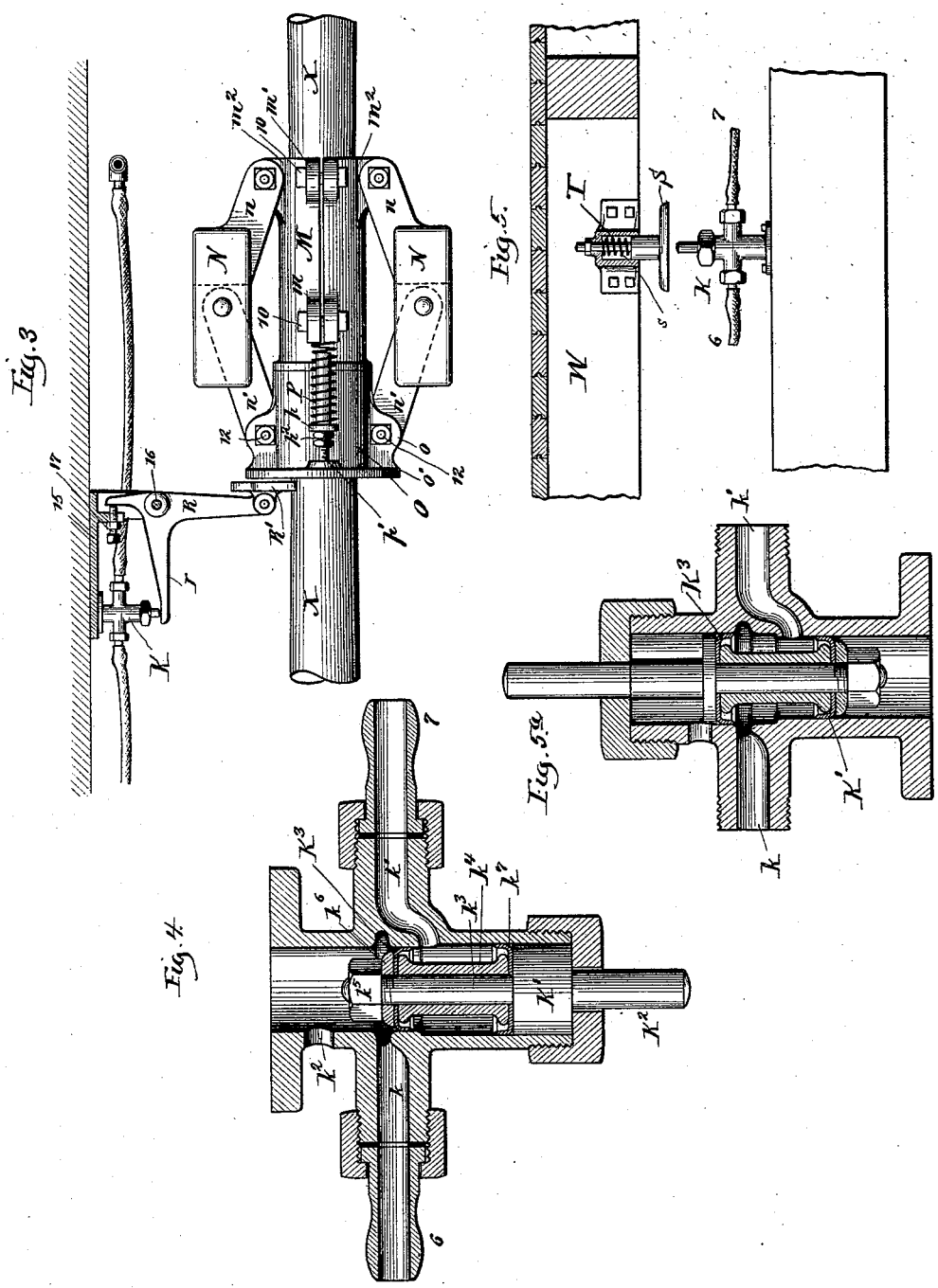
Witnesses:
Fred Gerlach
Alberta Adamick
Inventor:
B. F. Teal
By Price & Fisher
Attorneys.

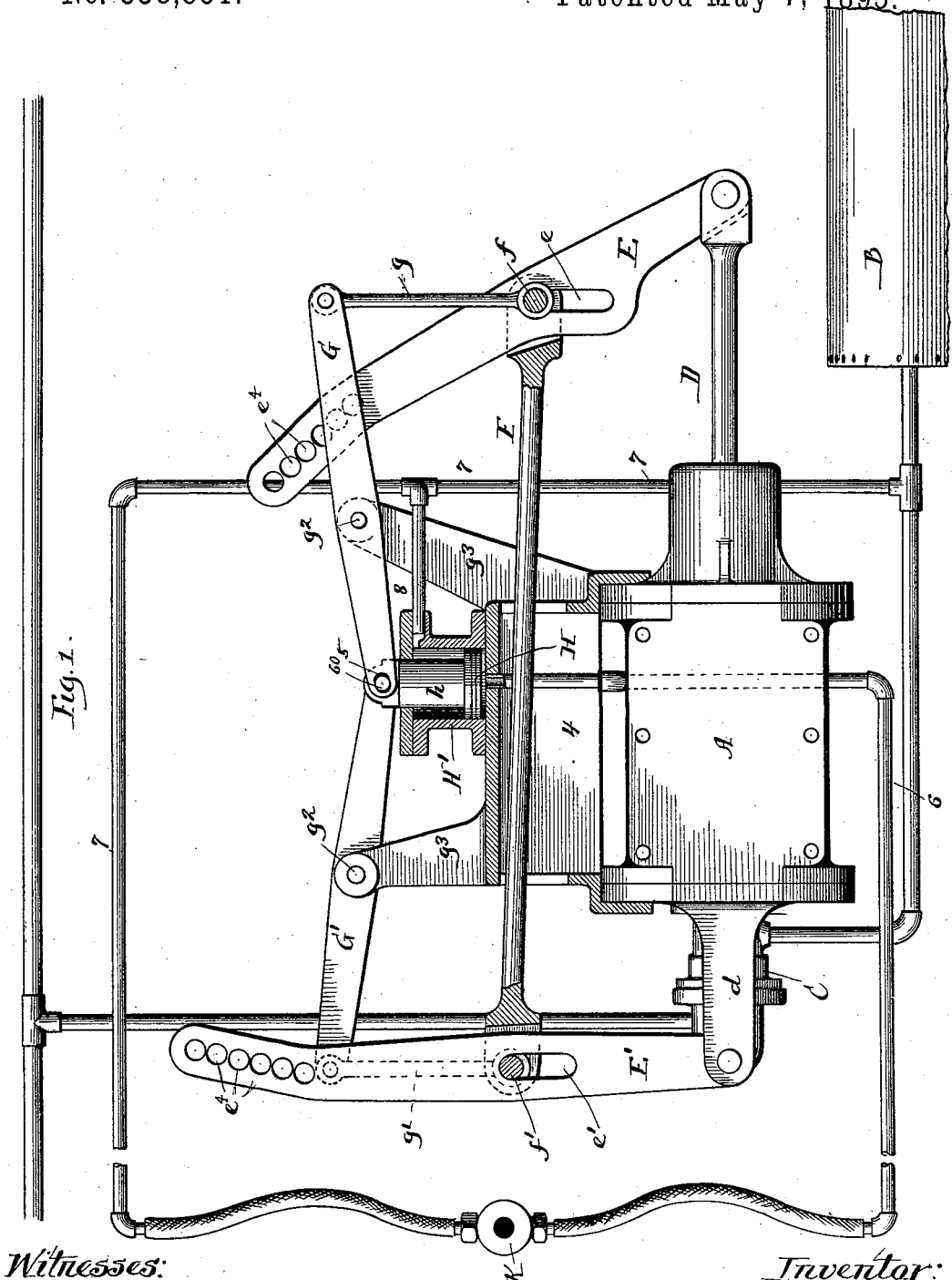

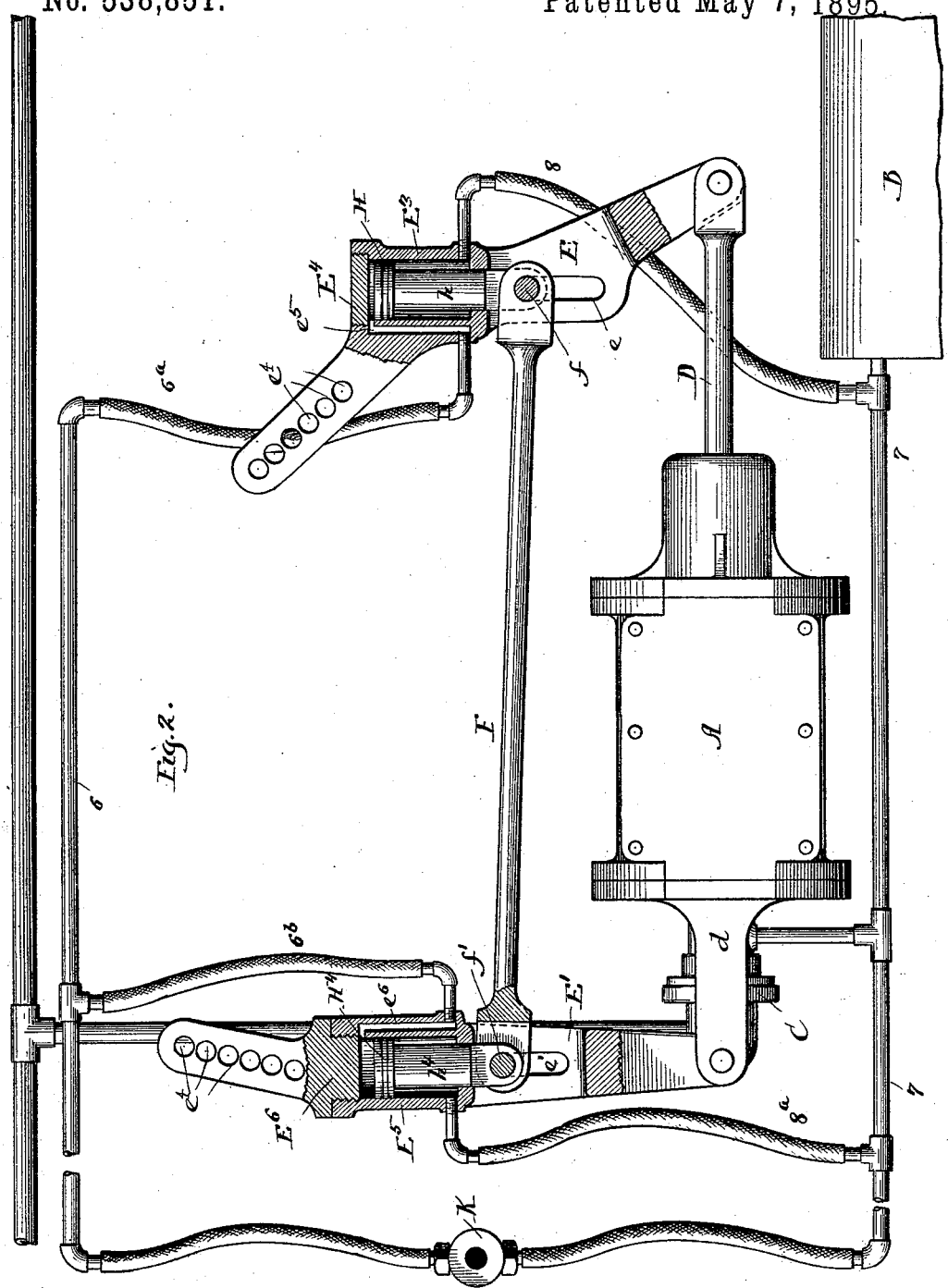

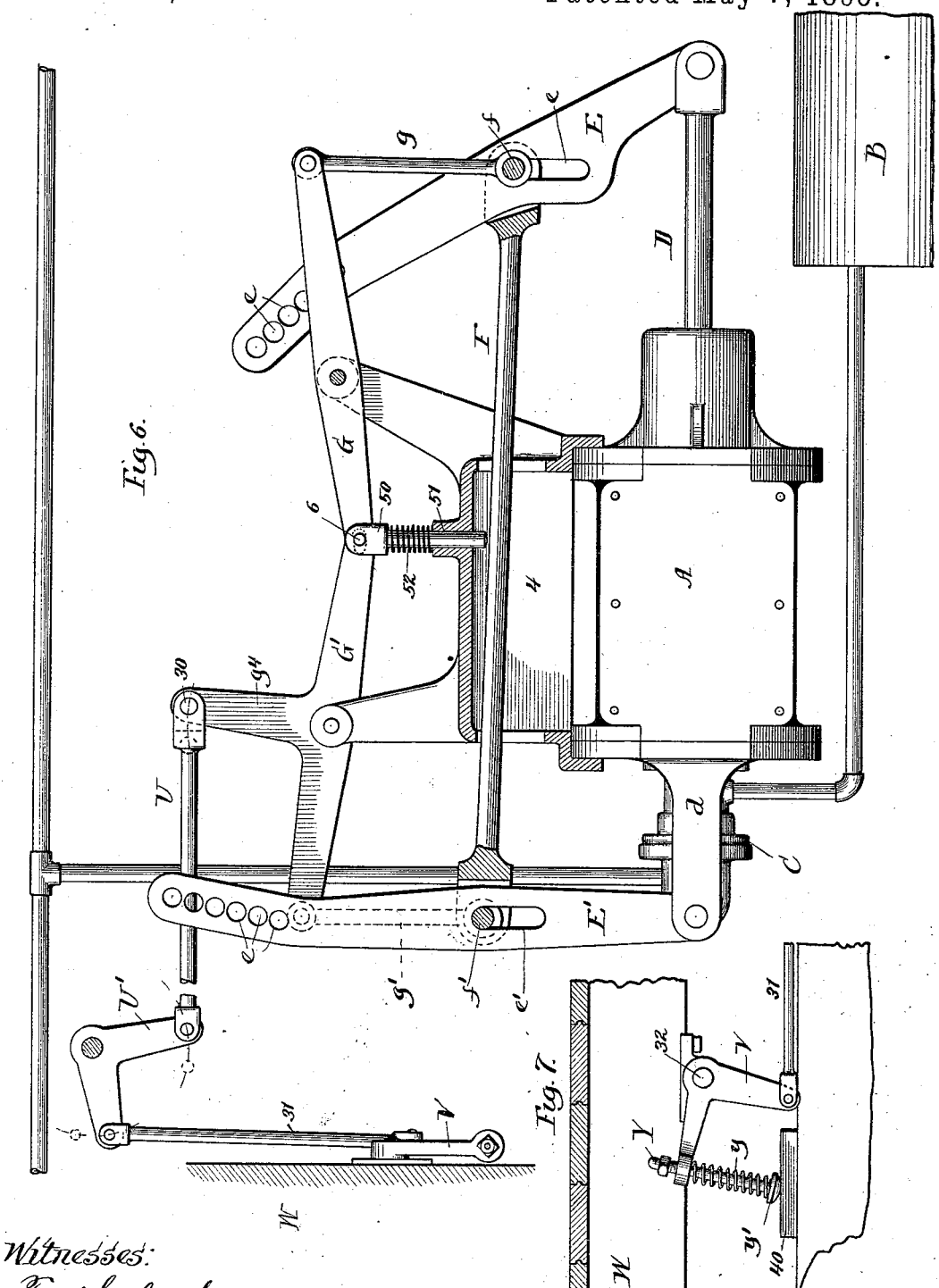

UNITED STATES PATENT OFFICE.

BENJAMIN FRANK. TEAL, OF CHICAGO, ILLINOIS, ASSIGNOR TO THE STANDARD VALVE COMPANY, OF SAME PLACE.

FLUID-PRESSURE BRAKE APPARATUS.

SPECIFICATION forming part of Letters Patent No. 538,851, dated May 7, 1895.

Application filed October 9, 1894. Serial No. 525,370. (No model.)

*To all whom it may concern:*

Be it known that I, BENJAMIN FRANKLIN TEAL, a citizen of the United States, residing at Chicago, Cook county, Illinois, have invented certain new and useful Improvements in Fluid-Pressure Brake Apparatus, of which I do declare the following to be a full, clear, and exact description, reference being had to the accompanying drawings, forming a part of this specification.

In the operation of railway trains in which fluid pressure brake apparatus is employed it is found, particularly with mixed freight trains, that the degree of fluid pressure that can be effectively employed in arresting the movement of the cars varies chiefly according to the weight of the cars and of the loads carried thereby. Thus with a heavily loaded car a much higher degree of fluid pressure can be used in setting the brakes than with a lighter or empty car because if upon a light car the same degree of fluid pressure be used in setting the brakes as is used with a loaded car, the wheels of the light car will be locked by the brake shoes and will be caused to slide upon the rails, thereby speedily flattening the rims of the wheels and so rendering them unfit for use. Various means have heretofore been devised for modifying the force with which the brakes are applied on the cars throughout the train in order to avoid the locking of the wheels by the brake shoes. In some cases it has been proposed to provide the cars with means whereby the weight of the load shall determine the degree of fluid pressure within the brake cylinders for setting the brakes and in other cases it has been proposed to employ governor mechanism for varying the fluid pressure within the brake cylinders when the speed of rotation of the car wheels was so reduced as to endanger the locking of the wheels.

My present invention has for its object to guard against the locking of the wheels by the brake shoes and this object I accomplish by providing improved means whereby while a uniform fluid pressure is maintained throughout the cars of the train, the force with which this pressure is applied upon the brake shoes may be automatically varied.

My invention consists in the various novel features hereinafter described, illustrated in the accompanying drawings, and particularly pointed out in the claims at the end of this specification.

Figure 1 is a plan view (parts being shown in section) of sufficient of the brake apparatus beneath a car to illustrate my invention. Fig. 2 is a view similar to Fig. 1, but showing a modified form of the invention. Fig. 3 is a view, in end elevation, showing part of one of the truck-axles with a centrifugal governor mounted thereon and with mechanism whereby the movement of this governor serves to operate the governor-valve shown in Figs. 1, 2, and 4. Fig. 4 is an enlarged view in vertical longitudinal section through the governor-valve. Fig. 5 is a detail view showing part of the car bottom and part of the truck with the governor-valve mounted upon the truck and means upon the bottom of the car for operating the governor-valve. Fig. 5$^a$ is a view similar to Fig. 4, but showing a modified construction of governor-valve. Fig. 6 is a plan view similar to Figs. 1 and 2, but showing a modified mechanism for shifting the connection between the brake-cylinder levers. Fig. 7 is a detail view showing part of the car-truck and car-bottom and the mechanism adjacent thereto, whereby the shifting of the connection between the brake-cylinder levers is effected under variations of the load of the car.

In carrying out my invention there are provided beneath the floor of the car a brake cylinder A and an auxiliary reservoir B of usual or suitable construction, the brake cylinder being provided with a suitable triple valve C that is connected with the auxiliary reservoir and with the train pipe in a manner well understood by those familiar with this class of apparatus. The brake cylinder A is provided with a piston, the rod D of which has pivotally connected thereto one of the cylinder levers E, and the opposite end of the brake cylinder is furnished with the usual arm or bracket $d$ to which is pivotally connected one end of the companion cylinder lever E'. The outer ends of the cylinder levers E and E' are shown as provided with the usual perforations $e^4$ to which the brake levers will be attached in the ordinary manner.

Between the cylinder levers E and E' extends the shifting connecting rod F. In the familiar Westinghouse type of air brake mechanism the cylinder levers E and E' are connected by a rod but the points at which this rod is united to the levers are fixed, that is to say, there is no shift of the points of attachment of the rod F with respect to the levers. In carrying out my invention I prefer to provide the cylinder levers E and E' with slots $e$ and $e'$ that receive the pivot bolts $f$ and $f'$ at the ends of the rod F. It is obvious that as the bolt $f$ serves as a fulcrum for the cylinder lever E, any variation in the position of this bolt $f$ along the slot $e$ will correspondingly modify the force with which the power acting upon the inner end of the lever E will be applied by the opposite end of the lever. In other words, if the bolt $f$ be moved toward the piston rod D then the arm of the lever E adjacent this piston-rod will be correspondingly shortened and the power exerted by the piston-rod will be exerted with correspondingly less force at the opposite end of the lever. So also it is manifest that if the bolt $f'$ at the opposite end of the rod F be moved in the slot $e'$ and toward the bracket $d$ the degree of power exerted by the outer end of the cylinder lever E' will be correspondingly less under the same movement of the shifting rod than it would be when the bolt $f'$ is in the position shown in Fig. 1 of the drawings. It will be manifest also that if the brakes are applied while the bolts $f$ and $f'$ of the rod F are in the position shown in Fig. 1 of the drawings, then if the bolts $f$ and $f'$ be moved along the slots $e$ and $e'$ toward the brake cylinder, a corresponding reduction in the force of application of the brake shoes will occur because by such shifting of the bolts the inner arms of the cylinder levers are shortened while their outer arms are correspondingly lengthened. It will be seen therefore that by my invention the force with which the brake shoes are applied to the wheels can be varied without necessarily varying the fluid pressure within the brake cylinders.

In carrying out my invention many means may be resorted to for varying the force with which the brakes are applied without changing the pressure within the brake cylinder and obviously these means may be interposed at any convenient point between the brake cylinder piston and the brake shoes. In the preferred form of the invention, however, I regard the use of variable cylinder-levers as the most desirable means of accomplishing my invention although I do not wish the invention to be understood as restricted thereto since it is manifestly of wide scope.

In the form of the invention illustrated in Fig. 1, the shifting of the bolts $f$ and $f'$ is effected by means of the links $g$ and $g'$ connected thereto respectively, and to the shifting levers G and G' that are pivoted as at $g^2$ to the brackets $g^3$ projecting from a casing 4 that is bolted to the brake cylinder or is otherwise conveniently sustained. The inner ends of the shifting levers G and G' are provided with slots 5 through which passes the pivot bolt 60 whereby the inner ends of these levers are connected to the outer end of the trunk $h$ of the differential piston H that is held in a manner free to move within the cylinder H'. One end of the cylinder H' is connected by a pipe 6 with one side of the governor valve K, the opposite side of this valve being connected to a pipe 7 which leads to the auxiliary reservoir B; and the opposite end of the cylinder H' is connected by a branch pipe 8 with the pipe 7. The trunk $h$ of the differential piston H is of such size as to materially reduce the area of the adjacent side of the differential piston H while leaving sufficient of the piston H exposed to hold the parts in their normal position. Seen in Fig. 1. The governor valve K is preferably of the construction illustrated in Fig. 4 of the drawings—that is to say, the casing of this valve is provided with the port $k$ communicating with the pipe 6, with the port $k'$ connected to the pipe 7 and with the escape port $k^2$ leading to the atmosphere and within the cylinder of this casing is placed the governor valve piston K', the lower end of the stem $K^2$ of which extends through the cap of the casing while the opposite end $k^3$ of the stem carries the valve $K^3$ consisting preferably of a cup leather that is held upon the stem by the sleeve $k^4$, the nut $k^5$ and follower $k^6$. Preferably also a cup leather $k^7$ is interposed between the sleeve $k^4$ and the inner face of the piston K'. The area of the inner face of the piston K' is somewhat larger than the area of the inner face of the escape valve $K^3$ and inasmuch as these faces of the piston and the valve are at all times exposed to fluid pressure admitted from the auxiliary reservoir by the port $k'$, the excess area of the piston K' will serve to normally hold the parts in the position shown by Fig. 4 of the drawings, at which time the pipe 6 will be in free communication with the atmosphere through the ports $k$ and $k^2$ and the casing of the governor valve. Hence it will be seen that if the governor valve K be assumed to be in the position shown in Fig. 4, there will be no pressure of air within the pipe 6 as the valve $K^3$ at such time cuts off communication between the ports $k$ and $k'$ and consequently the pressure of auxiliary reservoir air (see Fig. 1) passing by the pipe 7 and branch pipe 8, will act upon the smaller area of the differential piston H thereby forcing the piston to the position seen in Fig. 1. When however, the piston K, and the valve $K^3$ of the governor valve are shifted (by means to be hereinafter described), so that the valve $K^3$ cuts off communication between the ports $k$ and $k^2$ and establishes communication between the ports $k$ and $k'$, reservoir air will pass by pipe 7 and port $k'$ to the casing of the governor valve and thence by port $k$ and pipe 6 to the cylinder H' opposite the larger area of the differential piston H, thereby moving the piston H outward and causing the shifting levers G and G' to force the bolts $f$ and $f'$ along the slots $e$ and $e'$ of the cylinder levers E and E' toward the brake cylinder. This movement of the bolts $f$ and $f'$ will vary the action of the cylinder levers E and E' and correspondingly reduce the force transmitted by these levers from the piston-rod of the brake cylinder to the brake shoes, and this too without changing the position of the levers. When however the pressure whereby the piston of the governor valve K is moved from the position shown in Fig. 4 to the position last described, is relieved, the pressure of auxiliary reservoir air acting upon the inner face of the piston K' will force this piston outward thereby restoring the parts to the position seen in Fig. 4 and thus permitting the air to escape by ports $k$ and $k^2$ from the pipe 6 and so relieving pressure of air from the larger area of the differential piston H. When air pressure is thus released from the end of the cylinder H' opposite the larger area of the piston H, the pressure of auxiliary reservoir air upon the opposite side of the piston H will force the piston inward thus restoring the parts to the position seen in Fig. 1. It will therefore be seen that if the brakes be applied to the running wheels in the usual manner and the bolts $f$ and $f'$ be shifted as before described, the force with which the brake shoes act upon the wheels will be reduced and the parts will be so proportioned that the power will be such as to adequately guard against all danger of the locking of the wheels by the brake shoes. So also if provision be made (as hereinafter described), whereby when the cars are lightly loaded the bolts $f$ and $f'$ shall occupy positions within the slots $e$ and $e'$ adjacent the brake cylinder, then it is plain that when the fluid pressure is admitted to the brake cylinder to set the brakes, the cylinder levers E and E' will transmit the power from the piston-rod D to the brake shoes with correspondingly less force.

Various means may be employed for effecting the shifting of the governor valve mechanism illustrated in Fig. 4. Thus for example, one of the axles X of the car wheels may be provided with the centrifugal governor mechanism such as shown in Fig. 3 of the drawings. As this centrifugal governor mechanism forms the subject-matter of a separate application filed by me of even date herewith, Serial No. 525,369, I do not wish it to be understood as constituting a part of my present invention. Upon the axle X is fixed a sleeve M formed of separate sections having lugs $m$ and $m'$ united by the bolts 10, and having lugs $m^2$ upon which are pivoted the arms $n$ of the governor weights N. The weights N are slotted to receive the arms $n'$ that are pivotally connected as at 12 to the flanges $o$ of the sliding sleeve O, this sleeve being mounted to slide upon the fixed sleeve M and being provided at its outer end with an annular flange $o'$. Between the lugs $m$ of the fixed sleeve and the flange $o'$ of the sliding sleeve O extends the sleeve $p$ (one on each side but one only being shown), upon which is mounted the coil spring P and through the sleeve $p$ passes an adjusting bolt $p'$ that is fixed to the flange $o'$ of the sleeve O. By means of the sleeve $p$, the bolt $p'$ and the nut $p^2$ the power of the springs P can be determined. To the truck is fixed a plate 15 having a bracket wherein is pivotally sustained as at 16 the bell-crank lever R the inner end of which carries a pivoted shoe R' adapted to contact with the flange $o'$ of the sleeve O, and the opposite arm $r$ of this bell-crank lever extends in position to contact with the stem $K^2$ of the governor valve, the casing of which is conveniently attached to the plate 15. A set-screw 17 passing through a lug of the plate 15 is adapted by its contact with the upper arm of the lever R to determine the extent of movement of this lever. The centrifugal weights N tend to move radially outward when the axle X is revolved, being resisted in their outward movement by the coil springs P and as the weights move outward they retract the sleeve O to the position shown in Fig. 3. On the other hand, when the speed of revolution of the axle X is reduced to such point as to endanger the locking of the car wheels the weights N will collapse under the force of the springs P and thereby shifting the sleeve O outward until its flange $o'$ contacts with the shoe R' and so rocks the bell-crank lever R as to cause its arm $r$ to lift the stem $K^2$ of the governor valve until the valve $K^3$ is so shifted as to cut off communication through the valve casing between the ports $k$ and $k^2$ and establish communication between the ports $k$ and $k'$. Hence it will be seen that when the speed of revolution of the axle X is thus reduced and the governor valve is shifted, air will be allowed to pass through the governor valve casing into the pipe 6 and by this pipe to the end of the cylinder H' (see Fig. 1), opposite the larger area of the differential piston, thereby causing this piston to be moved outward so as to shift the bolts $f$ and $f'$ to the inner ends of the slots $e$ and $e'$ of the cylinder levers E and E' and thus so reduce the power transmitted from the brake cylinder to the brake shoes as to sufficiently relieve the pressure of the shoes upon the wheels to prevent the wheels becoming locked.

Instead of controlling the position of the governor valve by a centrifugal governor as last described, the governor valve may have its movement determined by the load of the car and in order to enable the valve to be thus controlled I prefer to construct the valve as illustrated in Fig. $5^a$ of the drawings and to arrange the valve intermediate the car truck and the car body W as shown in Fig. 5.

By referring to Figs. 5 and $5^a$ it will be seen that the governor valve D is mounted upon the car-truck and the stem $K^2$ extends upward through the cap of the valve casing and in position to be engaged by a plate S, the stem of which is encircled by a coiled spring s and has a reduced portion extending through a casing T that is bolted to one of the sills of the car floor W. The form of governor valve shown in Figs. 5 and 5ª differs from that illustrated in Fig. 4 in the particular that the area of the valve K³ opposite the piston K' is somewhat greater than the area of the piston. Consequently inasmuch as auxiliary reservoir air at all times passes by pipe 7 and port k' into the casing of the governor valve and between the piston K' and valve K³ the excess area of the valve K³ will hold the valve normally in the position shown in Fig. 5ª, thus establishing communication between the ports k and k' of the valve casing and consequently between the pipe 7, the pipe 6 and the end of the cylinder H' opposite the larger area of the differential piston H. Consequently when the form of governor valve K shown in Figs. 5 and 5ª is used the normal position of the mechanism illustrated in Fig. 1 of the drawings will be the reverse of that there illustrated, that is to say, the differential piston H will be at the outer end of the cylinder H' and the levers G and G' will be shifted so as to hold the bolts f and f' at the inner ends of the slots e and e' of the cylinder levers.

With the parts in the position last described it is manifest that when air is admitted to the brake cylinders in the usual manner to move the piston-rod D outward the brakes will be applied upon the wheels with less force than would be the case with the parts in the position shown in Fig. 1.

It will be seen by reference to Fig. 5 that the governor valve K will occupy the position shown in Fig. 5ª of the drawings when the depression plate S is out of contact with the stem K³ of the valve, and this will be the case when the car body is light or empty. When however, the car-body is loaded, thereby depressing the springs by which it is sustained, the plate S will bear upon the stem K² of the governor valve and will force downward the valve K³ until it cuts off communication between the ports k and k' of the valve casing and establishes communication between the pipe 6 and consequently the cylinder H' and the escape port k² of the valve casing, thereby allowing a free escape of air from the side of the cylinder H', opposite the larger area of the differential piston H. With the pipe 6 thus in free communication with the atmosphere, the pressure of auxiliary reservoir air admitted to the end of the cylinder H' opposite the smaller area of the piston H will force this piston inward thereby shifting the levers G and G' and bringing the bolts f and f' to the outer ends of the slots e and e' of the cylinder levers. The parts being thus in the position shown in Fig. 1 of the drawings, it is manifest that when air is admitted to the brake cylinder to set the brakes, the power exerted by the air within the cylinder will be applied with much greater force to the brake shoes than would be the case if the bolts f and f' were at the inner ends of the slots e and e' as above described. Hence it is that when the cars are loaded and their wheels can consequently receive a higher degree of brake pressure without danger of being locked, a corresponding higher degree of pressure will be transmitted from the brake cylinder to the brake shoes without variation of the pressure within the cylinder.

My purpose in forming the plate S broad, as shown, is to allow for the swinging of the car-body upon its trucks and the object of the spring T is to permit a yielding of the plate to guard against danger of injury of parts by reason of the movements of the car-body.

In Fig. 2 of the drawings is shown modified mechanism for effecting the shifting of the connecting rod F in order to vary the force of the cylinder levers E and E'. In this form of the invention the cylinder levers E and E' are provided with the slots e and e' that receive the bolts f and f' to which the rod F is connected, but in the construction shown in Fig. 2 each of the levers E and E' is formed with yoke-shaped arms between which the ends of the rod F are held in a manner free to move. So also in this form of the invention the lever E carries at its upper end a cylinder E³ wherein is placed the differential piston H, the trunk h of which projects through the bottom of the cylinder E³ and is connected to the bolt f at the end of the shifting rod F. The outer end of the cylinder E³ is preferably closed by a screw-cap E⁴ as shown. The end of the cylinder E³ opposite the smaller area of the piston H is connected by a branch pipe 8 of flexible material with the pipe 7 that leads to the auxiliary reservoir while the opposite end of the cylinder E³ has leading thereto a channel e⁵ to which connects a branch pipe 6ª that joins the pipe 6 that leads to the port k of the governor valve K, it being understood that the governor valve is the same in construction as in Figs. 1 and 4 of the drawings. In like manner the cylinder lever E' has its upper end formed with the cylinder E⁵ closed by the threaded cap E⁶ and within this cylinder is placed the differential piston H⁴, the trunk h⁴ of which extends through the bottom of the cylinder and is connected to the bolt f' at the end of the shifting rod F. The end of the cylinder E⁵ opposite the smaller area of the piston H⁴ is connected by a branch pipe 8ª with the pipe 7 that leads to the auxiliary reservoir, while the opposite end of the cylinder E⁵ is provided with a channel e⁶ to which is united a branch pipe 6ᵇ that connects with the pipe 6. From the foregoing description it will be seen that auxiliary reservoir air is at all times within the ends of the cylinders E³ and E⁵ opposite the smaller area of the differential pistons H and H⁴ and when the governor valve K is in the position shown in Fig. 4 a free escape of air is had from the opposite ends of the cylinders by the branch pipes $6^a$ and $6^b$, pipe 6 and ports $k$ and $k^2$ of the governor valve as shown in Fig. 5. It is manifest however, that when the governor valve K is shifted as in the operation of the form of my invention illustrated in Fig. 1 so as to establish communication between the pipes 6 and 7 by means of the ports $k$ and $k'$, auxiliary reservoir air will pass through the casing of the governor valve K and thence by the branch pipes $6^a$ and $6^b$ to the ends of the cylinders $E^3$, $E^5$ opposite the larger areas of the differential pistons, thereby shifting these pistons from the position shown in Fig. 2 inward until the bolts $f$ and $f'$ are brought to the inner ends of the slots $e$ and $e'$ of the cylinder levers. With the parts in the position last described, it is manifest that the power within the brake cylinder will be transmitted with much less force to the brake shoes than would be the case if the parts were in the position illustrated in Fig. 2.

In Figs. 6 and 7 of the drawings I have illustrated a modified form of my invention in which the variation of the leverage between the brake cylinder and the brake shoes is effected by variations in the weight of the load of the car. In this form of my invention the cylinder levers E and E', the connecting rod F, the links $g$ and $g'$ and shifting lever G are substantially the same in construction and arrangement as shown in Fig. 1 of the drawings, but the shifting lever G' is shown as provided with the arm $g^4$ by which there is transmitted to the shifting levers G and G' the force that serves to vary the action of the cylinder levers E and E'. To the arm $g^4$ is pivotally connected as at 30 the rod U the opposite end of which is pivoted to the bell-crank lever U' conveniently pivoted to a support on the car-body-frame, and the opposite arm of the bell-crank lever U' is pivoted to the rod 31 which in turn is pivotally connected to one arm of the bell-crank lever V that is carried by a pivot-rod or axle 32 sustained from the car-floor W. The opposite arm of the bell-crank lever V (see Fig. 7) is perforated and through it passes the bolt Y that is encircled by a coil spring $y$, the head $y'$ of this bolt being arranged to engage plate 40 conveniently attached to the car-truck as shown. The pivot-pin 60 by which the inner ends of the shifting levers G and G' are united is held within the yoke 50 at the upper end of the rod 51 that passes loosely through a bearing formed in the casing 4. This rod 51 is encircled by a coil-spring 52 that tends normally to force the shifting levers G and G' to a position the reverse of that shown in Fig. 7.

In the form of my invention illustrated in Figs. 6 and 7 of the drawings it will be seen that when the car is loaded and its floor depressed as seen in Fig. 7 the head $y'$ of the bolt Y will rest upon the bearing plate 40 of the truck and the spring $y$ being compressed will rock the bell-crank lever V about its pivot point 32 thereby causing the rod 31 to rock the bell-crank lever U' and force the shifting levers G and G' to the position seen in Fig. 6. When the levers G and G' are in the position shown in Fig. 6 the bolts $f$ and $f'$ will be at the outer ends of the slots $e$ and $e'$ of the cylinder levers. Consequently when fluid pressure is admitted to the brake cylinder A to set the brakes, this pressure will be transmitted by the levers E and E' to the brake shoes with the greatest force, since as before explained, the position of the bolts $f$ and $f'$ within the outer ends of the slots $e$ and $e'$ serves to most effectively transmit to the brake shoes the pressure within the brake cylinder. When however, the car is running light and its floor W is correspondingly raised so that the head $y'$ of the bolt Y no longer contacts with the bearing plate 40 the coil spring 52 will shift the levers G and G' to a position the reverse of that shown in Fig. 6 and will thereby move the bolts $f$ and $f'$ to the inner ends of the slots $e$ and $e'$ of the cylinder levers. With the bolts $f$ and $f'$ thus shifted it is manifest from what has already been said that a corresponding decrease in the force with which the power is transmitted to the brake shoes from the brake cylinder will occur; and it will be seen also that in the several forms of the invention there is a shifting part (such for example as the fulcrum $f$ of the cylinder lever E, or the power applying bolt $f'$ of the cylinder lever E') whereby the action of the lever mechanism is modified, this shifting part being in turn automatically movable in order to vary the action of the lever mechanism.

Having thus described the invention, what I claim as new, and desire to secure by Letters Patent, is—

1. In fluid pressure brake apparatus, the combination with the brake cylinder and its piston-rod and the cylinder levers of a shifting connecting rod between said levers and suitable means for shifting said rod to vary the force with which the power is transmitted by said levers from the brake cylinder.

2. In fluid pressure brake apparatus, the combination with the brake cylinder and its piston-rod and cylinder levers of a shifting connecting rod between said levers, loose connections between said shifting rod and said levers and suitable means whereby the position of said shifting rod with respect to the levers may be varied in order to vary the force with which the power is transmitted from the brake cylinder.

3. In fluid pressure brake apparatus, the combination with the brake cylinder and its piston-rod, of the slotted cylinder levers, a connecting rod extending between said slotted levers and having its ends movably united thereto and suitable means for shifting the ends of said rod to vary the force with which the power is transmitted by said levers.

4. In fluid pressure brake apparatus, the combination with the brake cylinder and its piston-rod and with the cylinder levers connected respectively to the piston-rod and to the opposite end of the brake cylinder, of a shifting connecting rod uniting said cylinder levers and means whereby both ends of said rod may be simultaneously shifted to vary the force with which power is transmitted by said levers from the brake cylinder.

5. In fluid pressure brake apparatus, the combination with the brake cylinder and its piston-rod and suitable lever mechanism connected thereto, of means for varying the force by which the power is transmitted from the brake cylinder to the brake shoes, comprising a shifting part for modifying the action of said lever mechanism and means for moving said shifting part comprising a piston, the cylinder of which is connected with the auxiliary reservoir and with the open air, and suitable valve mechanism for controlling the operation of said piston.

6. In fluid pressure brake apparatus, the combination with the brake cylinder and its piston-rod and suitable lever mechanism connected thereto, of a movable part (such for example as a fulcrum) for varying the force with which the power is transmitted by said lever mechanism to the brake shoes and means for shifting said movable part, comprising a differential piston the cylinder of which is connected at one end with the auxiliary reservoir and at its opposite end with both the auxiliary reservoir and with the atmosphere and suitable valve mechanism for controlling the admission and escape of reservoir air to and from the cylinder of the differential piston.

7. In fluid pressure brake apparatus, the combination with the brake cylinder and its piston-rod and with the cylinder levers, of a shifting rod movably connected at its ends to said levers and means for shifting the connections at the ends of said rod comprising a differential piston, and a cylinder for said piston, one end of which cylinder is in constant communication with the auxiliary reservoir and the opposite end of which cylinder is connected with the auxiliary reservoir and with an escape port and a governor valve for controlling the admission and escape of auxiliary reservoir air to and from the cylinder of said differential piston.

8. In fluid pressure brake apparatus, the combination with the brake cylinder and its piston-rod and with the cylinder levers, of a connecting rod having movable points of attachment to said cylinder levers and shifting levers for moving the points of attachment of said connecting rod with respect to said cylinder levers and means for operating said shifting levers.

B. FRANK. TEAL.

Witnesses:
   GEO. P. FISHER, Jr.,
   ALBERTA ADAMICK.